(12) United States Patent
Duan et al.

(10) Patent No.: US 8,103,162 B2
(45) Date of Patent: Jan. 24, 2012

(54) CHANNEL PROTECTION FOR MULTI-CHANNEL OPTICAL TRANSMISSION SYSTEM AND METHOD

(75) Inventors: Yong Duan, Shenzhen (CN); Zhihui Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 965 days.

(21) Appl. No.: 12/062,309

(22) Filed: Apr. 3, 2008

(65) Prior Publication Data

US 2010/0278526 A1 Nov. 4, 2010

Related U.S. Application Data

(63) Continuation of application No. PCT/CN2007/070967, filed on Oct. 26, 2007.

(30) Foreign Application Priority Data

Oct. 27, 2006 (CN) .......................... 2006 1 0142656

(51) Int. Cl.
*H04B 10/00* (2006.01)
*H04J 14/00* (2006.01)

(52) U.S. Cl. .............................. 398/5; 398/7
(58) Field of Classification Search ................. 398/5, 7
See application file for complete search history.

(56) References Cited

U.S. PATENT DOCUMENTS

| 5,731,887 A | 3/1998 | Fee |
| 5,943,149 A * | 8/1999 | Cearns et al. ................ 398/79 |
| 7,099,578 B1 * | 8/2006 | Gerstel ............................ 398/5 |
| 2002/0019955 A1 | 2/2002 | Lazzeri |
| 2004/0161232 A1 * | 8/2004 | Kerfoot, III ..................... 398/5 |
| 2004/0208569 A1 * | 10/2004 | Nabeyama et al. ............ 398/79 |
| 2006/0263008 A1 * | 11/2006 | Deacon et al. ................. 385/37 |
| 2010/0034532 A1 * | 2/2010 | Ghelfi et al. ..................... 398/2 |

FOREIGN PATENT DOCUMENTS

| CN | 1336745 A | 2/2002 |
| CN | 1490968 A | 4/2004 |
| CN | 1936630 A | 3/2007 |
| CN | 1945991 A | 4/2007 |
| EP | 1450509 A2 | 8/2004 |
| JP | 11211924 A | 8/1999 |

(Continued)

OTHER PUBLICATIONS

International Search Report for International Application No. PCT/CN2007/070967, dated Feb. 14, 2008, and English translation thereof.

(Continued)

Primary Examiner — Nathan Curs (57) ABSTRACT

An optoelectronic integrated apparatus, including a plurality of working optical source links, at least one spare optical source link, at least one spare data channel, and a protection control unit for detecting whether there is any working optical source link faulty. When detecting that a working optical source link is faulty, controlling a spare optical source link whose emission wavelength is the same as the faulty working optical source link to fulfill the functions of the faulty working optical source link and switching a data signal from the working data channel to a spare data channel. The spare optical source link is adapted to modulate the optical signal using the data signal from the spare data channel, and transmits the modulated optical signal. Reliability of the optoelectronic integrated apparatus is enhanced without increasing the maintenance cost.

11 Claims, 6 Drawing Sheets

FOREIGN PATENT DOCUMENTS

| | | |
|---|---|---|
| JP | 2000503192 A | 3/2000 |
| JP | 2000151514 A | 5/2000 |
| JP | 2001085798 A | 3/2001 |
| JP | 2004254317 A | 9/2004 |
| WO | 97/25829 A2 | 7/1997 |

OTHER PUBLICATIONS

Chinese Office Action for Chinese Patent Application No. 2006101426562, dated Jun. 27, 2008, and English translation thereof.

Notice of Reasons for Rejection for Japanese Patent Application No. 2008-551636, dated Nov. 10, 2009, and English translation thereof.

Written Opinion of the International Searching Authority for International Application No. PCT/CN2007/070967, dated Feb. 14, 2008.

European Search Report for European Patent Application No. 07817158.4, dated Jul. 27, 2009.

Decision of Rejection for Japaese Patent Application No. 2008-551636, dated Nov. 24, 2010, and English translation thereof.

* cited by examiner

(Prior Art)

CHANNEL PROTECTION FOR MULTI-CHANNEL OPTICAL TRANSMISSION SYSTEM AND METHOD

CROSS-REFERENCE TO RELATED APPLICATIONS

This application is a continuation of International Application No. PCT/CN2007/070967, filed Oct. 26, 2007. This application claims the benefit of Chinese Application No. 200610142656.2, filed Oct. 27, 2006. The disclosures of the above applications are incorporated herein by reference.

FIELD

The present disclosure relates to optical communication technologies and to an optoelectronic integrated apparatus and a method for protecting optoelectronic integrated apparatus.

BACKGROUND

The statements in this section merely provide background information related to the present disclosure and may not constitute prior art.

Dense Wavelength-Division Multiplexing (DWDM) technology has become a dominant technology used in both long-haul and regional backbone transmission networks, and is gradually being introduced into Metropolitan Area Network (MAN). Conventional DWDM systems adopt separate encapsulation, i.e. fabricating linecards dedicated for one or more optical devices, and the linecards are inter-connected by fibers.

With developments in the technology, prices of optical devices are decreasing continuously. The cost of encapsulating an optical device typically remains high, and has become a bottleneck keeping the cost of the whole optical device high. Taking a laser as an example, the core of the laser may cost only several dollars, while the encapsulation may cost hundreds of dollars.

During the past few years, people have made efforts to integrate several optical devices, such as lasers and modulators on one semiconductor substrate to eliminate the cost generated by encapsulating each optical device separately. Meanwhile, the volumes of sub-modules, e.g. sub-modules for transmitting, receiving and monitoring in a DWDM system, are greatly reduced due to the reduction in encapsulation.

Figure 1:
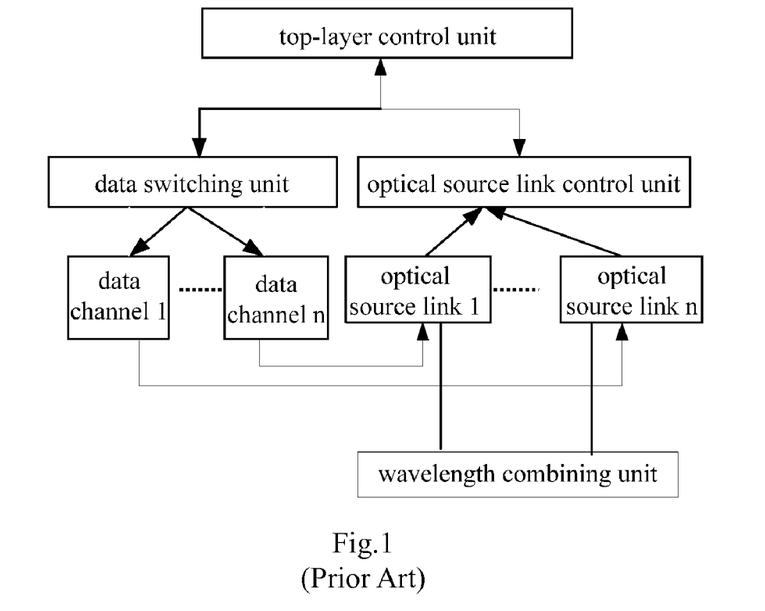
FIG. 1 is a schematic diagram illustrating the interior structure of an optoelectronic integrated apparatus at the transmitting end in the prior art.
Figure 2:
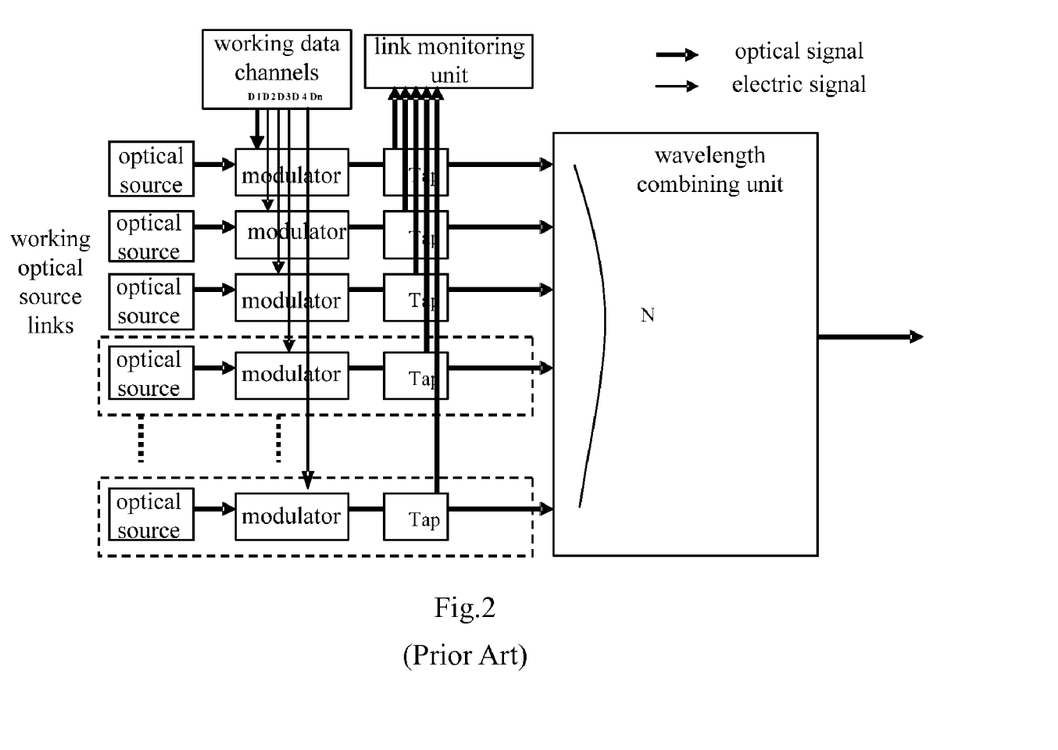
FIG. 2 is a schematic diagram illustrating data transmission by data channels and optical source links at the transmitting end of an optoelectronic integrated apparatus in the prior art.
Figure 3:
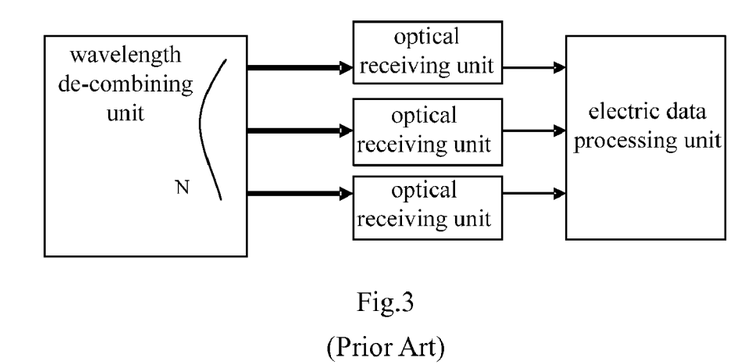
FIG. 3 is a schematic diagram illustrating the structure of an optoelectronic integrated apparatus at the receiving end in the prior art.

An optoelectronic integrated circuit is an apparatus in which several optical devices are integrated on a semiconductor substrate with corresponding periphery control circuits. FIG. 1 is a schematic diagram of the interior structure of an optoelectronic integrated apparatus at the transmitting end in accordance with the prior art. Referring to FIG. 1, in order to transmit information through an optoelectronic integrated circuit, the optoelectronic integrated apparatus at the transmitting end includes in its interior a top-layer control unit, a data switching unit, an optical source link control unit, n optical source links and n data channels corresponding to the n optical source links, and a wavelength combining unit, in which the "n" refers to the number of optical source links or data channels. FIG. 2 is a schematic diagram illustrating the data transmission using the data channels and the optical source links at the transmitting end of the optoelectronic integrated apparatus in the prior art. Referring to FIGS. 1 and 2, in practical service applications, each optical source link mainly includes an optical source and a modulator, and may also includes an optical link wiretapping (Tap) module. A link checking circuit in the optical source link control unit checks the performance of each optical source link by use of each corresponding Tap module, so that the optical source link control unit can adjust the optical source link suitably according to the result of checking, e.g. adjust the optical power in the optical source link. FIG. 3 is a schematic diagram illustrating a structure of the optoelectronic integrated apparatus at the receiving end in the prior art. Referring to FIG. 3, the optoelectronic integrated apparatus at the receiving end mainly includes in its interior a wavelength de-combining unit, n optical receiving units and an electric data processing unit.

When the optoelectronic integrated apparatus at the transmitting end is in operation, the optical source in an optical source link generates and outputs an optical signal to the modulator, and a corresponding data channel outputs an electric signal to the modulator. The modulator then modulates the received optical signal and the electric signal to generate and output an optical signal to the wavelength combining unit. The wavelength combining unit combines the optical signals received from all the optical source links and then outputs the combined optical signals to the optoelectronic integrated apparatus at the receiving end. In the optoelectronic integrated apparatus at the receiving end, the wavelength de-combining unit de-combines the received optical signals and outputs the de-combined n-way optical signals to the corresponding optical receiving units respectively, and each optical receiving unit converts a received optical signal into an electric signal and then outputs the electric signal to the electric data processing unit. Then the electric data processing unit processes the electric signals according to a certain service processing procedure.

At present, optical signals are of many advantages over electric signals in information delivering, such as enhanced capability of anti-interference, higher transmission speed, and etc. Therefore, the optoelectronic integrated apparatus has been used widely.

There are presently, however, no effective protecting measures for the optoelectronic integrated apparatus at the moment. Each optical source link may be used as a working link for transmitting service data. Thereby, when a failure, e.g., an optical source fails to emit light or a modulator malfunctions, occurs in any optical source link in an optoelectronic integrated apparatus, the whole optoelectronic integrated apparatus can not function properly, and thus the reliability of the optoelectronic integrated apparatus is impaired. In order to restore the working of the optoelectronic integrated apparatus, measures such as replacement, should be adopted in the prior art. However, because the components of each optical source link in an optoelectronic integrated apparatus are integrated on the same substrate and are encapsulated along with all the others, the faulty optical source link can not be replaced individually. As a result, the whole optoelectronic integrated circuit has to be replaced, which increases the maintenance and repair cost greatly.

SUMMARY

Various embodiments provide a method for protecting optoelectronic integrated apparatus, in order to provide efficient protecting measures for optoelectronic integrated apparatus and enhance the reliability of the apparatus. An optoelectronic integrated apparatus is also provided.

The technical schemes according to various embodiments are illustrated as follows.

An optoelectronic integrated apparatus is provided, which includes: a protection control unit, a plurality of working optical source links, at least one spare optical source link, and at least one spare data channel corresponding to the at least one spare optical source link, in which the protection control unit is adapted to detect whether there is any working optical source link faulty, and when detecting that a working optical source link is faulty, control a spare optical source link whose emission wavelength is the same as the faulty working optical source link to fulfill the functions of the faulty working optical source link, and switch the data signal from the working data channel of the faulty working optical source link to the spare data channel of the spare optical source link when detecting that the working optical source link is faulty;

the spare optical source link is adapted to modulate the optical signal generated by the spare optical source link using the data signal from the spare data channel, and transmit the modulated optical signal.

A method for protecting optoelectronic integrated apparatus is also provided, which includes:

detecting whether there is any working optical source link faulty in the optoelectronic integrated apparatus; and when detecting that a working optical source link is faulty, controlling a spare optical source link which has the same emission wavelength as the faulty working optical source link to fulfill the functions of the faulty working optical source link, switching data from the working data channel corresponding to the faulty working optical source link to a spare data channel, modulating the optical signal generated in the spare optical source link using the electric signal output from the spare data channel, and transmitting the modulated optical signal.

As can be seen from the above, according to the embodiments, a fault of a working optical source link can be detected, and the service transmission, which was performed by the service data from the faulty working optical source link and the corresponding working data channel, can be implemented by use of a spare optical source link and a corresponding spare data channel. Therefore, the optoelectronic integrated apparatus functions properly even if the working optical source link fails, which provides effective protection for the optoelectronic integrated apparatus and enhances the reliability of the optoelectronic integrated apparatus.

Furthermore, in various embodiments, the spare wavelength-tunable optical source link and a corresponding spare data channel can transmit the service data for the faulty working optical source link and the corresponding data channel automatically without replacing the whole optoelectronic integrated apparatus as performed in the prior art. As a result, the maintenance cost of the optoelectronic integrated apparatus is reduced, and accordingly the maintenance workload of the maintenance worker is reduced because the maintenance will not be carried out manually.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Various embodiments provide a method for protecting optoelectronic integrated apparatus, which includes: checking whether there is a fault in each of the working optical source links in the optoelectronic integrated apparatus at the transmitting end; when a fault of a working optical source link is detected, controlling a spare wavelength-tunable optical source link and a corresponding spare data channel to transmit the service data which were being transmitted by the faulty working optical source link and the working data channel corresponding to the faulty working optical source link.

Figure 4A:
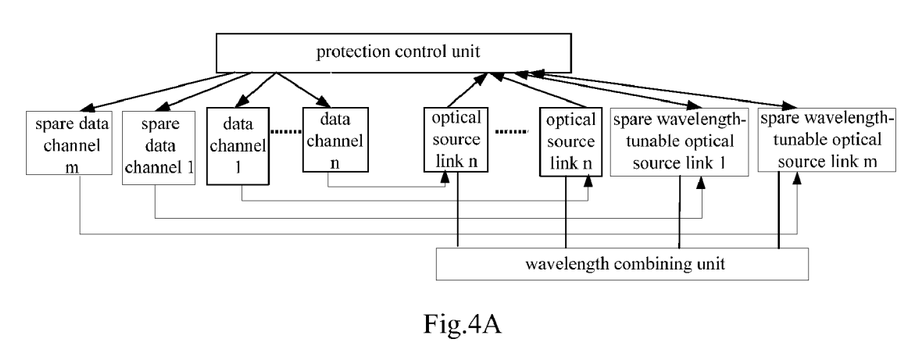
FIG. 4A is a schematic diagram illustrating the basic structure of an optoelectronic integrated apparatus in accordance with various embodiments.

According to various embodiments of the optoelectronic integrated apparatus. FIG. 4A is a schematic diagram illustrating the basic structure of the optoelectronic integrated apparatus. Referring to FIG. 4A, the optoelectronic integrated apparatus according to various embodiments mainly includes: a protection control unit, a plurality of working optical source links and working data channels corresponding to the plurality of working optical source links, and one or more spare optical source links which are wavelength-tunable and spare data channels corresponding to the one or more spare optical source links in the interior of the apparatus.

The protection control unit detects faults of the working optical source links. When a fault of a working optical source link is detected, the protection control unit activates a wavelength-tunable spare optical source link and a spare data channel corresponding to the wavelength-tunable spare optical source link, and manages a switching process which switches an electric signal from the working data channel of the faulty working optical source link to the spare data channel of the activated spare optical source link.

The spare data channel of the activated spare optical source link transmits the received electric signal to the activated spare optical source link. The activated spare optical source link, after being activated, generates an optical signal from the wavelength-tunable optical source, modulates the generated optical signal using the electric signal received from the spare data channel and outputs the modulated optical signal.

Figure 4B:
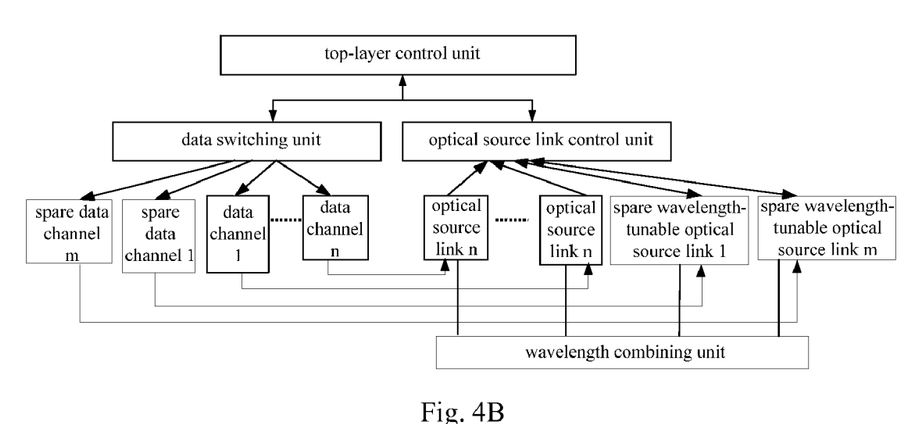
FIG. 4B is a schematic diagram illustrating the detailed structure of the optoelectronic integrated apparatus in accordance with various embodiments.

FIG. 4B is a schematic diagram illustrating the detailed structure of the optoelectronic integrated apparatus according to various embodiments. Referring to FIGS. 4A and 4B, the protection control unit of the optoelectronic integrated apparatus in the embodiment includes: a top-layer control unit, and a data switching unit, a link monitoring unit and an optical source link control unit.

Figure 5A:
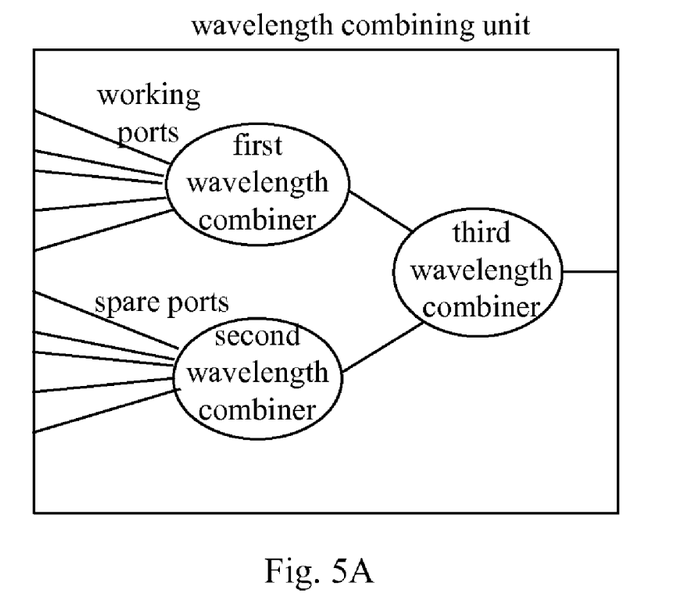
FIG. 5A is a schematic diagram illustrating a structure of a wavelength combining unit in an optoelectronic integrated apparatus in accordance with various embodiments.

FIG. 5A is a schematic diagram illustrating a structure of a wavelength combining unit in the optoelectronic integrated apparatus according to various embodiments. Referring to FIG. 5A, as the spare optical source link adopts a wavelength-tunable optical source, the wavelength combining unit of the optoelectronic integrated apparatus in the embodiment includes in its interior: a first wavelength combiner connected to all working ports each of which corresponds to a working optical source link respectively; a second wavelength combiner connected to each spare port corresponding to each working optical source link respectively; and a third wavelength combiner connected to both the first wavelength combiner and the second wavelength combiner, in which, the first wavelength combiner is adapted to receive optical signals from each working optical source link via each connected working port, combine and then transmit the received optical signals to the third wavelength combiner;

the second wavelength combiner is adapted to tune the central wavelength to accord with the emission wavelength of the faulty working optical source link, connect to the activated spare optical source link via the spare port corresponding to the faulty working optical source link, combine the optical signals received from the spare port corresponding to the faulty working optical source link and then transmit the combined signal to the third wavelength combiner; and the third wavelength combiner is adapted to combine all the received optical signals and then output the combined signal to an optoelectronic integrated apparatus at the receiving end.

Figure 5B:
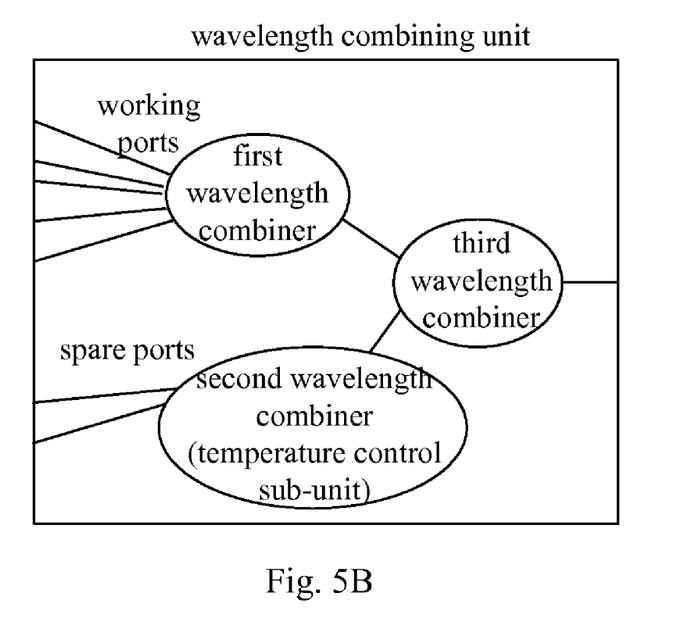
FIG. 5B is a schematic diagram illustrating another structure of a wavelength combining unit in the optoelectronic integrated apparatus in accordance with various embodiments.

FIG. 5B is a schematic diagram illustrating another structure of the wavelength combining unit of the optoelectronic integrated apparatus according to various embodiments. Referring to FIG. 5B, as the spare optical source link adopts an wavelength-tunable optical source, the wavelength combining unit includes in the interior: a first wavelength combiner connected to each working port corresponding to each working optical source link respectively, a second wavelength combiner connected to one or more spare ports, and a third wavelength combiner connected to both the first wavelength combiner and the second wavelength combiner, wherein the first wavelength combiner is adapted to receive optical signals from each working optical source link via each connected working port, combine the received optical signals and then transmit the combined signal to the third wavelength combiner;

the second wavelength combiner is adapted to adjust the temperature of the second wavelength combiner so as to tune the central wavelength of a first spare port among the spare ports to accord with the emission wavelength of the faulty working optical source link, connect to the activated spare optical source link via the first spare port, combine the optical signal received from the first spare port and then transmit the combined signal to the third wavelength combiner; and the third wavelength combiner is adapted to combine all the received optical signals and then transmit the combined signal to an optoelectronic integrated apparatus at the receiving end.

According to various embodiments, each working optical source link or each spare optical source link mainly includes an optical source, and may also include a modulator, a detecting unit and a light absorber, in which the detecting unit may be, for example, a Tap.

Figure 6:
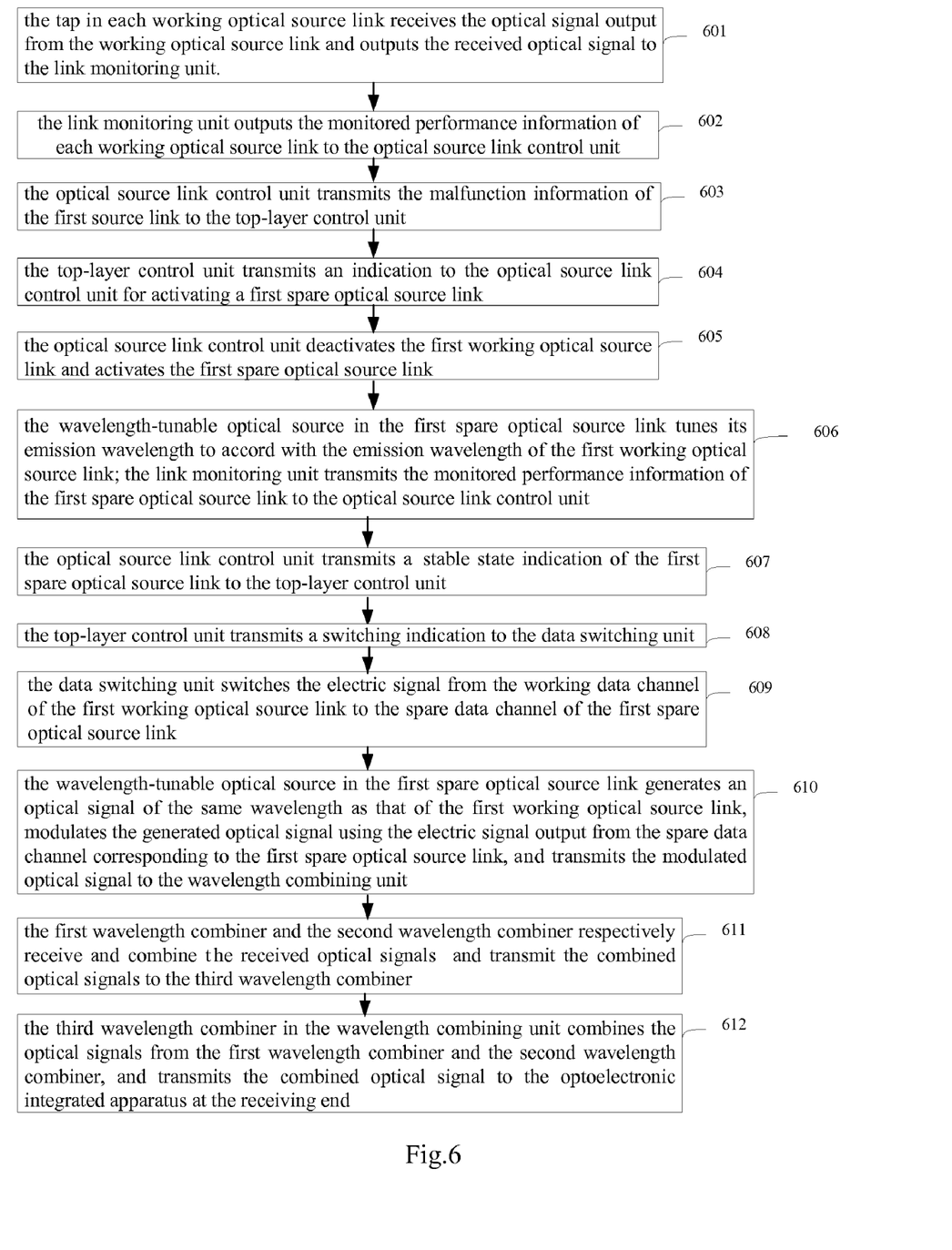
FIG. 6 is a flowchart illustrating the process for protecting the optoelectronic integrated apparatus according to various embodiments.
Figure 7:
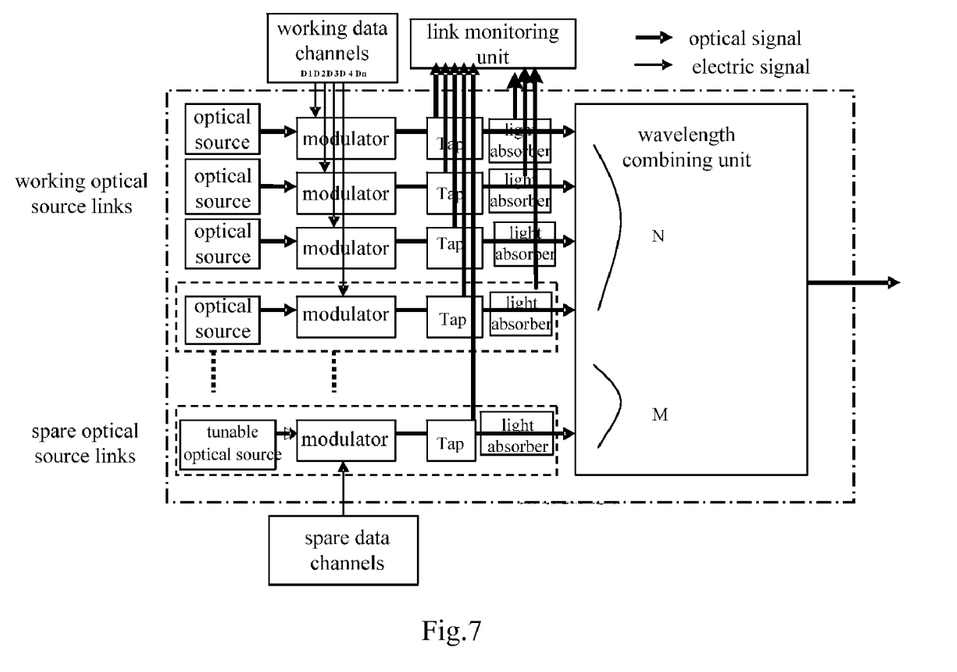
FIG. 7 is a schematic diagram illustrating a structure for transmitting data using data channels and optical source links of an optoelectronic integrated apparatus at the transmitting end in accordance with various embodiments.

FIG. 6 is a flowchart illustrating the process of protecting an optoelectronic integrated apparatus according to an embodiment. According to various embodiments and referring to FIGS. 4A, 4B, 5A, 5B, 6, and 7, one or more wavelength-tunable spare optical source links and spare data channels corresponding to the one or more wavelength-tunable spare optical source links are reserved in the optoelectronic integrated apparatus. As shown in FIG. 7, a detecting unit is set in each working optical source link. The process of protecting an optoelectronic integrated apparatus by using the optoelectronic integrated apparatus provided by the embodiment is shown as follows.

Block 601: In the optoelectronic integrated apparatus at the transmitting end, a detecting unit in a working optical source link, for example a Tap unit, receives the optical signal output from the working optical source link, and outputs the received optical signal to a link monitoring unit.

A Tap may output a portion, e.g. 5%, of the energy of the received optical signal to the link monitoring unit.

Block 602: In the optoelectronic integrated apparatus at the transmitting end, the link monitoring unit analyzes the optical signal output from each Tap of each optical source link, examines the performances of the working optical source links, and outputs the monitored performance information to the optical source link control unit.

Block 603: In the optoelectronic integrated apparatus at the transmitting end, the optical source link control unit determines whether each working optical source link is faulty in accordance with the received monitored performance information of each working optical source link, and transmits the fault information of the faulty source link to the top-layer control unit when determining a working optical source link, e.g. the first working optical source link among the working optical source links, is faulty.

It should be noted that, detecting the fault of the working optical source links is carried out in conjunction with the structure of the optoelectronic integrated apparatus at the transmitting end shown in FIG. 7 from Block 601 to Block 603. In combination with the structure of the optoelectronic integrated apparatus at the transmitting end shown in FIG. 8, if the detecting unit functions after the combining procedure of the wavelength combining unit, the monitoring process from Block 601 to Block 603 may be replaced by the following process.

Figure 8:
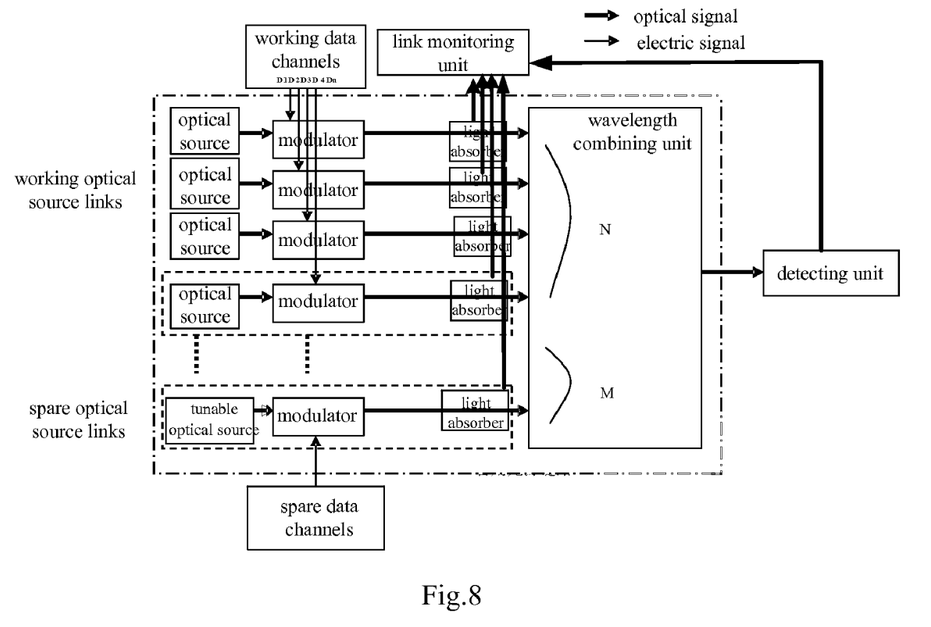
FIG. 8 is a schematic diagram illustrating another structure for transmitting data using data channels and optical source links of an optoelectronic integrated apparatus at the transmitting end in accordance with various embodiments.

The detecting unit, e.g. a Tap, receives the combined optical signal output from the wavelength combining unit, and outputs the received optical signal to the link monitoring unit. The detecting unit may output a portion, such as 5%, of the energy of the received optical signal to the link monitoring unit. The link monitoring unit analyzes the spectrum and the optical power of the optical signal output from the detecting unit of each optical source link or analyzes a optical track signal of each optical source link and transmits the analysis result of the spectrum and optical power or the analysis result of the optical track signal of each optical source link to the optical source link control unit. The optical source link control unit detects performance changes in the spectrum and optical power or performance changes in the optical track signal of each optical source link in accordance with the received analysis result, so as to determine whether each working optical source link is faulty. When determining that the first working optical source link among the working optical source links is faulty, the optical source link control unit transmits the fault information of the faulty working optical source link to the top-layer control unit. When utilizing a optical track signal, it is necessary to add a optical track signal to an optical source in each optical source link in advance, for example, adding low frequency interference of different frequencies to the optical source in different optical source links.

Block 604: In the optoelectronic integrated apparatus at the transmitting end, the top-layer control unit transmits an indication to the optical source link control unit for activating a first spare wavelength-tunable optical source link among the spare wavelength-tunable optical source links after receiving the fault information of the first working optical source link.

If several spare wavelength-tunable optical source links and spare data channels corresponding to the several spare wavelength-tunable optical source links are preset in the optoelectronic integrated apparatus, the first spare wavelength-tunable optical source link and the spare data channel corresponding to the first spare wavelength-tunable optical source link described herein and hereafter are selected according to priorities preset by the top-layer control unit for each spare optical source link and the spare data channel corresponding to the spare optical source link, or optionally selected from all the preset spare optical source links and spare data channels corresponding to the preset spare optical source links by the top-layer control unit; or selected from all the preset spare optical source links and the spare data channels corresponding to the preset spare optical source links according to other policies preset by the top-layer control unit.

Block 605: In the optoelectronic integrated apparatus at the transmitting end, the optical source link control unit deactivates the first working optical source link and activates the first spare wavelength-tunable optical source link on receiving the indication for activating the first spare optical source link, and transmits an indication for tuning the wavelength of the first spare optical source link to accord with the emission wavelength of the first working optical source link to the spare optical source link.

When there is a light absorber in each optical source link, the optical source link control unit may also activate the light absorber in the first working optical source link. The light absorber in the first working optical source link absorbs the optical signal output from the first working optical source link after being activated, so as to ensure that the first working optical source link generates no interference optical signal after being faulty.

Block 606: In the optoelectronic integrated apparatus at the transmitting end, when activated, the wavelength-tunable optical source in the first spare optical source link tunes its emission wavelength to accord with the emission wavelength of the first working optical source link; and the link monitoring unit examines the performance of the first spare optical source link and transmits the monitored performance information of the first spare optical source link to the optical source link control unit.

Block 607: In the optoelectronic integrated apparatus at the transmitting end, the optical source link control unit determines whether the first spare optical source link reaches a stable state in accordance with the received monitored performance information of the first spare optical source link. The optical source link control unit transmits the stable state indication of the first spare optical source link to the top-layer control unit when determining the first spare optical source link reaches a stable state.

In Block 607, when determining the first spare optical source link has not reached a stable state, the optical source link control unit may transmit an indication of an unstable state to the link monitoring unit, and the link monitoring unit controls the light absorber in the first spare wavelength-tunable optical source link to absorb the optical signal output from the first spare optical source link, so as to avoid interfering with other working links because the first spare optical source link has just begun to work and has not reached a stable state. The link monitoring unit deactivates the light absorber when the first spare optical source link reaches a stable state.

Block 608: In the optoelectronic integrated apparatus at the transmitting end, on receiving a stable state indication of the first spare optical source link, the top-layer control unit transmits a switching indication to the data switching unit for switching the electric signal from the working data channel of the first working optical source link to the spare data channel of the first spare optical source link.

It should be noted that, in the above process, the top-layer control unit does not transmit the switching indication to the data switching unit until receiving the stable state indication for the first spare optical source link. In practical service applications, after receiving the fault information of the first working optical source link in Block 604, the top-layer control unit may immediately transmit the switching indication to the data switching unit for switching the electric signal from the working data channel of the first working optical source link to the spare data channel of the first spare optical source link.

Block 609: In the optoelectronic integrated apparatus at the transmitting end, on receiving the switch indication, the data switching unit switches the electric signal from the working data channel of the first working optical source link to the spare data channel of the first spare optical source link.

Block 610: In the optoelectronic integrated apparatus at the transmitting end, the optical source in the first spare wavelength-tunable optical source link generates an optical signal of the same wavelength as that of the first working optical source link, modulates the generated optical signal using the electric signal output from the spare data channel of the activated spare optical source link, then transmits the modulated optical signal to the wavelength combining unit.

Block 611: in the optoelectronic integrated apparatus at the transmitting end, the first wavelength combiner and the second wavelength combiner in the wavelength combining unit respectively receive and combine optical signals transmitted from the optical source links and transmit the combined optical signals to the third wavelength combiner. It should be noted that, in the above process, after receiving the fault information of the first working optical source link in Block 604, the top-layer control unit transmits an indication to the wavelength combining unit of connecting the wavelength combining unit to the first spare optical source link.

Referring to FIG. 5A, when the interior structure of the wavelength combining unit is as shown in FIG. 5A, after receiving the connected indication, the wavelength combining unit connects the spare port of the first working optical source link in the wavelength combining unit with the first spare wavelength-tunable optical source link. Thus, in Block 611, in various embodiments, the wavelength combining unit may receive the optical signal output from each optical source link, and the implementation may include the following steps. The second wavelength combiner in the wavelength combining unit tunes its central wavelength to accord with the wavelength of the first working optical source link, connects to the first spare wavelength-tunable optical source link via a first spare port corresponding to the first working optical source link, and combines the optical signal received from the spare port corresponding to the first working optical source link, and then transmits the combined optical signal to the third wavelength combiner. The first wavelength combiner receives the optical signal transmitted from each working optical source link via each connected working port, and combines the received optical signal and then transmits the combined optical signal to the third wavelength combiner.

Referring to FIG. 5B, when the interior structure of the wavelength combining unit is as shown in FIG. 5B, after receiving the connected indication, the wavelength combining unit connects the spare port corresponding to the first working optical source link in the wavelength combining unit with the first spare wavelength-tunable optical source link. Thus, in Block 611, in various embodiments, the wavelength combining unit may receive the optical signal output from each optical source link, which may be implemented as according to the following steps. The second wavelength combiner in the wavelength combining unit may include a temperature control sub-unit. The temperature control sub-unit adjusts the temperature to tune central wavelength of the first spare port to accord with the emission wavelength of the first working optical source link. The second wavelength combiner connects to the first spare wavelength-tunable optical source link via the first spare port, combines the optical signal received from the first spare port and then transmits the combined signal to the third wavelength combiner. The first wavelength combiner receives the optical signal transmitted from each working optical source link via each connected working port, and combines the received optical signal and then transmits the combined optical signal to the third wavelength combiner.

It should be noted that, in various embodiments, a 1×N optical switch may be included between each spare wavelength-tunable optical source link and the second wavelength combiner. Accordingly, the first wavelength-tunable spare optical source link connects, via the 1×N optical switches, to the spare port which is connected to the second wavelength combiner, wherein N is larger than or equal to the number of the spare ports. Alternatively, in various embodiments, an optical splitter and an optical switch may be set between each spare wavelength-tunable optical source link and the second wavelength combiner, in which case the first wavelength-tunable spare optical source link connects, via the optical splitter and the optical switch, to the spare port which is connected to the second wavelength combiner.

Block 612: In the optoelectronic integrated apparatus at the transmitting end, the third wavelength combiner in the wavelength combining unit combines the optical signal from the first wavelength combiner and the optical signal from the second wavelength combiner, and transmits the combined optical signal to the optoelectronic integrated apparatus at the receiving end.

The optoelectronic integrated apparatus at the receiving end receives the optical signal subsequently. According to various embodiments, the first spare optical link may tune the emission wavelength of the optical source to accord with the emission wavelength of the first working optical source link. Thus, the last optical signal output from the optoelectronic integrated apparatus at the transmitting end is the same as the optical signal transmitted from the first working optical source link before being faulty. In this way, there is no alterations made to the optoelectronic integrated apparatus at the receiving end, and the detailed receiving process is same as that of the optoelectronic integrated apparatus at the receiving end in the prior art.

It should be noted that, in the above process according to some embodiments, the protecting process implemented by the protection control unit in the interior of the optoelectronic integrated apparatus at the transmitting end may also be implemented by an existing top-layer control unit, a data switching unit and an optical source link control unit. In practical service applications, the protection control unit, according to other embodiments, may also be a new functional unit in the interior of the optoelectronic integrated apparatus, and the principle of protecting the optoelectronic integrated apparatus is the same as that of the above embodiments.

According to some embodiments, the emission wavelength of each spare wavelength-tunable optical source link may be pre-tuned to accord with the average value of the emission wavelengths of all the working optical source links. The spare optical source links are in an inactive state and the optical signals output of all the spare optical source links are shut-down. When the first working optical source link fails, the optoelectronic integrated apparatus at the transmitting end activates the selected spare wavelength-tunable optical source link, switches the data from the working data channel of the faulty working optical source link to the spare data channel of the selected spare optical source link, and modulates the optical signal generated from the selected spare optical source link by using the electric signal output from the spare data channel of the selected spare optical source link, then transmits the modulated optical signal to the wavelength combining unit.

Furthermore, according to the above embodiments, the detecting unit, e.g. a Tap, and the link monitoring unit collaboratively monitor the performance of the working optical source links. In practical service applications, monitoring the performance of the working optical source link may be achieved by other measures, and the principle of the detailed process is the same as that of the process provided by the above embodiment.

According to some embodiments, the working data channels and the spare data channels may be set in two respective apparatuses or be incorporated in one apparatus.

Moreover, according to some embodiments, the light absorber has two functions. One is to monitor the optical power of the whole link according to the optical power absorbed by the light absorber when the optical source link in which the light absorber is located, functions properly. The other function is to absorb almost all of the optical signals in the optical source link where the light absorber is located when the optical source link is faulty, and this is done by applying a control signal, generally a voltage signal, to the light absorber so that the whole faulty optical source link is shut down. The light absorber may be an optical switch or PIN tube or other element. When the light absorber is a PIN tube, it can detect the output power of the optical signal when applied a positive voltage, and absorb the optical signal when applied a negative voltage.

Furthermore, in some embodiments, the wavelength combining unit may be an AWG or N×1 wavelength multiplexer and etc.

Figure 9:
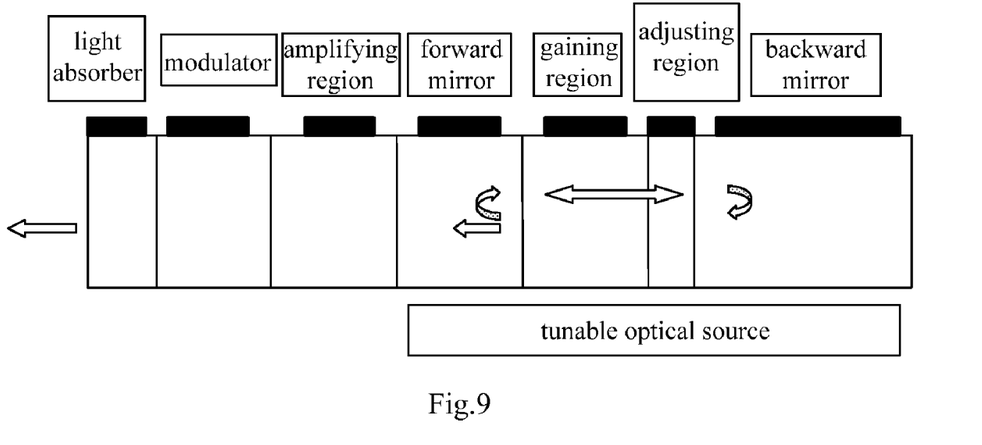
FIG. 9 is a schematic diagram illustrating a structure of a wavelength-tunable optical source link.

According to some embodiments, each wavelength-tunable optical source link includes a wavelength-tunable optical source. The tunable range of the wavelength is so wide that it can cover the spectrum of all the working optical source links. The wavelength-tunable optical source may be implemented in pluralities of ways, for example by adopting SG-DBR and GCSR to adjust the circuit. There are two ways to integrate the wavelength-tunable optical source. One is to generate the wavelength-tunable optical source together with the fixed-wavelength optical source while fabricating the optoelectronic integrated circuit, wherein the wavelength-tunable optical source link is as shown in FIG. 9 (prior art), and the black parts in FIG. 9 are the controlling pins on which leads are welded to be connected to outside pins of the optoelectronic integrated circuit. The other is to produce a laser with a wavelength-tunable optical source by other technical measures and mount the laser on the generated semiconductor base.

In addition, according to some embodiments, the working optical source links and the spare optical source links may be located on the same integrated circuit board or on respective integrated circuit boards.

Moreover, the above embodiments are described in detail in conjunction with the optoelectronic integrated apparatus. In practical service applications, the method according to some embodiments may not rely on the optoelectronic integrated apparatus described herein, in which case the principle of the processing is the same as that of the procedure provided by the above described embodiments, except that the optoelectronic integrated apparatus at the transmitting end performs the steps of the above embodiments without specified functional unit in the interior of the optoelectronic integrated apparatus at the transmitting end.

In general, the above are only various embodiments and are not intended to limit the protection scope. Any modification, equivalent replacement and improvement made under the principle of the present teachings should be included in the protection scope.

What is claimed is:

1. An optoelectronic integrated apparatus, comprising:
a protection control unit;
a plurality of working optical source links, at least one spare optical source link, and
at least one spare data channel corresponding to the at least one spare optical source link;
wherein the protection control unit is adapted to detect whether there is any working optical source link faulty, and when detecting that a working optical source link is faulty, control a spare optical source link whose emission wavelength is the same as the faulty working optical source link to fulfill the functions of the faulty working optical source link, and switch the data signal from the working data channel of the faulty working optical source link to the spare data channel of the spare optical source link when detecting that the working optical source link is faulty; and
wherein the spare optical source link is adapted to modulate the optical signal generated by the spare optical source link using the data signal from the spare data channel, and transmit the modulated optical signal;
wherein the protection control unit comprises:
a top-layer control unit,
a data switching unit,
an optical source link control unit, and
a link monitoring unit, wherein
the link monitoring unit is adapted to examine the performance of a working optical source link and transmit a monitored performance information of the working optical source link to the optical source link control unit;
the optical source link control unit is adapted to determine whether the working optical source link is faulty in accordance with the received monitored performance information of the working optical source link, transmit the fault information of the faulty working optical source link to the top-layer control unit when determining the working optical source link is faulty, and shut down the output of the faulty working optical source link on receiving the indication of turning on the spare optical source link;
the top-layer control unit is adapted to transmit an indication to the optical source link control unit for turning on the spare optical source link on receiving the fault information of the working optical source link, and transmit a switching indication to the data switching unit for switching the electric signal from the working data channel of the faulty working optical source link to the spare data channel of the spare optical source link; and
the data switching unit is adapted to switch the electric signal from the working data channel of the faulty working optical source link to the spare data channel of the spare optical source link on receiving the switching indication.

2. The optoelectronic integrated apparatus according to claim 1, wherein the spare optical source link is wavelength tunable.

3. The optoelectronic integrated apparatus according to claim 1, further comprises: a wavelength combining unit,
wherein the wavelength combining unit comprises:
a first wavelength combiner connected to the plurality of working optical source links via a plurality of working ports,
a second wavelength combiner connected to the at least one spare optical source link via at least one spare port, and
a third wavelength combiner,
wherein the first wavelength combiner is adapted to receive from the plurality of working ports optical signals transmitted by the plurality of working optical source links, combine the received optical signals and transmit the combined optical signal to the third wavelength combiner;
the second wavelength combiner is adapted to receive from the at least one spare port optical signal transmitted by the at least one spare optical source link, if there is one received optical signal, transmit the one received optical signal to the third wavelength combiner, if there is more than one received optical signal, combine the more than one received optical signal and transmit the combined optical signal to the third wavelength combiner; and
the third wavelength combiner is adapted to combine the received optical signals and output the combined optical signal.

4. The optoelectronic integrated apparatus according to claim 3, wherein
the top-layer control unit is adapted to transmit an indication to the wavelength combining unit for connecting the wavelength combining unit to the spare optical source link.

5. The optoelectronic integrated apparatus according to claim 4, wherein:
the wavelength combining unit further comprises a temperature controlling unit;
the at least one spare port is connected to the at least one spare optical source link respectively; and
the temperature controlling unit is adapted to adjust the temperature of the temperature controlling unit so as to tune the central wavelength of the spare port which is connected to the spare optical source link to accord with the emission wavelength of the faulty working optical source link on receiving the indication from the top-layer control unit.

6. The optoelectronic integrated apparatus according to claim 4, wherein:

the spare optical source link is connected to the at least one spare port via a 1×N optical switch or via an optical splitter and an optical switch, wherein N is larger than or equal to the number of the spare ports; and the wavelength combining unit is adapted to connect the spare optical source link to the spare port whose central wavelength is the same as the emission wavelength of the faulty working optical source link via the 1×N optical switch or via the optical splitter and the optical switch on receiving the indication from the top-layer control unit.

7. The optoelectronic integrated apparatus according to claim 4, wherein the working optical source link comprises a detecting unit adapted to receive the optical signal output from the working optical source link and transmit the optical signal to the link monitoring unit, wherein the link monitoring unit is adapted to examine the performance of a working optical source link by analyzing the performance of the optical signal output from the detecting unit in the working optical source link, and generate monitored performance information for the working optical source link.

8. The optoelectronic integrated apparatus according to claim 4, further comprising a detecting unit connected to the wavelength combining unit and adapted to receive the combined optical signal output from the wavelength combining unit and transmit the optical signal to the link monitoring unit, wherein the link monitoring unit is adapted to examine the performance of a working optical source link by analyzing the spectrum and the optical power of the optical signal output from the detecting unit or by analyzing a optical track signal, and transmit the analysis result of the spectrum and optical power or the analysis result of the optical track signal in a working optical source link to the optical source link control unit as the monitored performance information of the working optical source link.

9. The optoelectronic integrated apparatus according to claim 1, wherein the link monitoring unit is further adapted to examine the performance of a spare optical source link when the spare optical source link is turned on, and transmit the monitored performance information of the spare optical source link to the optical source link control unit;

the optical source link control unit is further adapted to determine whether the spare optical source link reaches a stable state in accordance with the received monitored performance information of the spare optical source link, and transmits the stable state information of the spare optical source link to the top-layer control unit when determining the spare optical source link reaches the stable state; and the top-layer control unit is adapted to transmit the switching indication to the data switching unit for switching the electric signal from the working data channel of the faulty working optical source link to the spare data channel of the spare optical source link after receiving the stable state information of the activated spare optical source link.

10. The optoelectronic integrated apparatus according to claim 1, wherein a working optical source link further comprises a light absorber, and the protection control unit is further adapted to control the light absorber to absorb the optical signal generated by the working optical source link when detecting that the working optical source link is faulty; or wherein a spare optical source link further comprises a light absorber; and the protection control unit is further adapted to detect whether the spare optical source link reaches a stable state, control the light absorber in the spare optical source link to absorb the optical signal generated by the spare optical source link, and shut down the light absorber when detecting that the spare optical source link reaches a stable state.

11. A method for protecting optoelectronic integrated apparatus, comprising:

examining, by a link monitoring unit, the performance of a working optical source link and transmitting a monitored performance information of the working optical source link to a optical source link control unit;

determining, by the optical source link control unit, whether the working optical source link is faulty in accordance with the received monitored performance information of the working optical source link, transmitting the fault information of the faulty working optical source link to a top-layer control unit when determining the working optical source link is faulty, and shutting down the output of the faulty working optical source link on receiving the indication of turning on a spare optical source link;

transmitting, by the top-layer control unit, an indication to the optical source link control unit for turning on the spare optical source link on receiving the fault information of the working optical source link, and transmitting a switching indication to a data switching unit for switching the electric signal from a working data channel of the faulty working optical source link to the spare data channel of the spare optical source link;

switching, by the data switching unit, the electric signal from the working data channel of the faulty working optical source link to the spare data channel of the spare optical source link on receiving the switching indication; and modulating, by the spare optical source link, the optical signal generated by the spare optical source link using the data signal from the spare data channel, and transmitting the modulated optical signal.

* * * * *